US009475474B2

(12) United States Patent
Takeuchi et al.

(10) Patent No.: US 9,475,474 B2
(45) Date of Patent: Oct. 25, 2016

(54) VEHICLE BRAKE DEVICE

(71) Applicants: ADVICS CO., LTD., Kariya (JP);
TOYOTA JIDOSHA KABUSHIKI KAISHA, Toyota-shi (JP)

(72) Inventors: Kiyohito Takeuchi, Nagoya (JP);
Masaki Maruyama, Nagoya (JP);
Masaaki Komazawa, Miyoshi (JP);
Yusuke Kamiya, Okazaki (JP)

(73) Assignees: ADVICS CO., LTD., Kariya, Aichi-Pref. (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 88 days.

(21) Appl. No.: 13/934,730

(22) Filed: Jul. 3, 2013

(65) Prior Publication Data
US 2014/0008967 A1 Jan. 9, 2014

(30) Foreign Application Priority Data

Jul. 4, 2012 (JP) .................................. 2012-150617

(51) Int. Cl.
*B60T 13/74* (2006.01)
*B60T 13/16* (2006.01)
*B60T 8/32* (2006.01)
*B60T 8/36* (2006.01)
(Continued)

(52) U.S. Cl.
CPC ............ *B60T 13/161* (2013.01); *B60T 8/3265* (2013.01); *B60T 8/3655* (2013.01); *B60T 8/4077* (2013.01); *B60T 13/147* (2013.01); *B60T 2201/06* (2013.01)

(58) Field of Classification Search
CPC .......... B60T 8/17; B60T 8/171; B60T 8/172; B60T 8/34; B60T 13/66; B60T 17/22; B60T 17/223; B60T 2220/04; B60T 13/161; B60T 13/147; B60T 8/3265; B60T 8/3655; B60T 8/4077; B60T 2201/06
USPC ...... 303/3, 15, 155, 20, 191, DIG. 1, DIG. 2
See application file for complete search history.

(56) References Cited

U.S. PATENT DOCUMENTS

2003/0090149 A1* 5/2003 Kusano et al. ................ 303/191
2003/0214177 A1* 11/2003 Kusano et al. ............ 303/113.1
(Continued)

FOREIGN PATENT DOCUMENTS

CN           1978257 A      6/2007
CN        101289084 A     10/2008
(Continued)

OTHER PUBLICATIONS

Machine translation of JP-2010221882.*
(Continued)

*Primary Examiner* — Melody Burch
(74) *Attorney, Agent, or Firm* — Buchanan Ingersoll & Rooney PC

(57) ABSTRACT

The present invention relates to a vehicle brake device which can secure the durability of a linear valve for controlling a servo pressure. The brake ECU of the vehicle brake device sets a reference servo pressure based on the operating amount of a brake pedal when the vehicle is stopped and sets a target servo pressure based on the reference servo pressure during one braking operation. Further, the brake ECU sets the reference servo pressure based on the operating amount of the brake pedal when the servo pressure calculated in response to the operating amount of the brake pedal exceeds the servo pressure change threshold value set with a deviation from the reference servo pressure calculated in response to the brake pedal operating amount.

5 Claims, 5 Drawing Sheets

(51) Int. Cl.
  *B60T 8/40* (2006.01)
  *B60T 13/14* (2006.01)
  *B60T 7/00* (2006.01)

(56) References Cited

U.S. PATENT DOCUMENTS

2007/0132312 A1* 6/2007 Ajiro et al. .................. 303/155
2011/0241418 A1* 10/2011 Nozawa et al. ................ 303/3

FOREIGN PATENT DOCUMENTS

| CN | 102205839 | A | 10/2011 |
|---|---|---|---|
| JP | 2010-095026 | A | 4/2010 |
| JP | 2010-221882 | A | 10/2010 |
| JP | 2011-156998 | A | 8/2011 |
| JP | 2012-16984 | A | 1/2012 |

OTHER PUBLICATIONS

Machine translation of JP-201095026.*
U.S. Appl. No. 13/777,795, filed Feb. 26, 2013, Kuki et al.
U.S. Appl. No. 13/840,018, filed Mar. 15, 2013, Shimizu et al.
U.S. Appl. No. 13/850,041, filed Mar. 25, 2013, Maruyama et al.
Office Action (Notification of Reasons for Rejection) issued on Sep. 2, 2014, by the Japan Patent Office in corresponding Japanese Patent Application No. 2012-150617, and an English translation of the Office Action. (4 pages).

* cited by examiner

Cylinder opening side ⟵⟶ Cylinder bottom surface side

VEHICLE BRAKE DEVICE

This application claims priority under 35 U.S.C. 119 with respect to Japanese Application No. 2012-150617 filed in Japan on Jul. 4, 2012, the entire content of which is herein incorporated by reference.

BACKGROUND OF THE INVENTION

This invention relates to a vehicle brake device which controls friction braking force applied to a vehicle.

As a conventional vehicle brake device, a vehicle brake device disclosed in Patent Document 1 has been known. According to a master cylinder disclosed in the Patent Document 1, a required friction braking force is calculated by deducting a required regeneration braking force from a required braking force which is calculated in response to an operation amount of a brake pedal detected by a sensor under a state that an input piston which is operated in response to a brake pedal operation and a master piston are separated from each other. Thereafter, a pilot pressure is generated in response to the required friction braking force by a linear valve connected to an accumulator. Thus obtained pilot pressure is inputted into a regulator by which a servo pressure corresponding to the pilot pressure is generated. The master piston is displaced in response to the servo pressure applied thereto thereby generating a master pressure in a master chamber. The master pressure is applied to a wheel cylinder to generate a friction braking force.

DOCUMENT LIST OF STATE OF ART

Patent Document

Patent Document 1: JP2012-16984 A

DISCLOSURE OF INVENTION

Problems to be Solved

Generally, when a driver of a vehicle depresses upon a brake pedal while the vehicle is stopped, the pedal position is changed in a subtle way which may slightly change the pedal depression amount also in a subtle way. This slight change of the depression amount may influence on the friction braking force to be calculated. Under such state, the linear valve which generates the pilot pressure is continuing the operation and friction parts thereof may be worn and a durability of the linear valve may be deteriorated.

The present invention was made in consideration with the above problems and the object of the invention is to provide a vehicle brake device which can secure the durability of a linear valve which controls the servo pressure.

Means for Solving the Problem

The feature in structure of the invention according to one aspect of the invention made for solving the above problem is characterized in that a vehicle brake device for applying a friction braking force to a vehicle wheel generated by a friction brake device provided at the vehicle wheel by supplying a brake fluid to a wheel cylinder of the friction brake device. The vehicle brake device comprises a brake operating member, a brake operating amount detecting means for detecting a brake operating amount of the brake operating member, a target servo pressure setting means for setting a target servo pressure based on the brake operating amount of the brake operating member detected by the brake operating amount detecting means, a servo pressure generating portion for generating a servo pressure, a brake fluid pressurizing portion for supplying pressurized brake fluid to the wheel cylinder by the servo pressure, a linear valve for controlling the servo pressure generating portion so that the servo pressure generated by the servo pressure generating portion becomes the target servo pressure and a vehicle stopping state judging means for judging whether the vehicle is sopped or not. The target servo pressure setting means includes a target servo pressure under vehicle running state setting means for setting the target servo pressure based on the brake operating amount of the brake operating member when the vehicle stopping state judging means judges that the vehicle is not stopped and a target servo pressure under vehicle stopping state setting means for setting the target servo pressure based on the brake operating amount of the brake operating member when the servo pressure calculated in response to the brake operating amount of the brake operating member exceeds a servo pressure change threshold value defined with a predetermined deviation from a reference servo pressure which is set based on the operating amount of the brake operating member under the vehicle being stopped when the vehicle stopping state judging means judges that the vehicle is stopped.

The feature in structure of the invention according to a second aspect is characterized in that in the first aspect, the brake fluid pressurizing portion includes a master piston connected to the wheel cylinder, a master piston slidably disposed in the master cylinder for changing a volume of a master chamber to be filled with the brake fluid supplied to the wheel cylinder by being driven by the servo pressure exerting in a servo pressure chamber defined by the master cylinder and an input piston slidably disposed in the master cylinder at a position rearward of the master piston for defining a separation chamber between the master piston and the input piston and filled with the brake fluid, the input piston being operated in association with the brake operation of the brake operating member, wherein the target servo pressure under vehicle stopping state setting means calculates a brake operating speed which corresponds to a speed of the brake operating amount based on the brake operating amount of the brake operating member detected by the brake operating amount detecting means and sets the servo pressure change threshold value by setting a deviation which value is set to be small when the brake operating speed is smaller when the servo pressure calculated in response to the brake operating amount of the brake operating member exceeds the servo pressure change threshold value.

The feature in structure of the invention according to a third aspect is characterized in that in the second aspect, the target servo pressure under vehicle stopping state setting means sets the servo pressure change threshold value by setting a deviation which value is set to be large when the time for the servo pressure change threshold value being not changed from the servo pressure change threshold value being set based on the deviation has passed a predetermined defined time.

According to the first aspect of the invention, the target servo pressure under vehicle stopping state setting means sets a reference servo pressure based on the operating amount of the brake operating member when the vehicle is stopped and then sets a target servo pressure based on the reference servo pressure during one braking operation. The reference servo pressure is not linearly changed and accordingly, the target servo pressure is not linearly changed during the vehicle being stopped. Thus, the linear valve which generates a pilot pressure does not continuously operate, thereby preventing frictional deterioration of a movable portion of the linear valve during vehicle stopping state. This can improve the durability of the linear valve. The target servo pressure under vehicle stopping state setting means sets the reference servo pressure based on the operating amount of the brake operating member when the servo pressure calculated in response to the operating amount of the brake operating member exceeds the servo pressure change threshold value which is set with a predetermined deviation from the reference servo pressure. Therefore, the reference servo pressure which is a reference value of the target servo pressure at the vehicle being stopped is changed only when the servo pressure calculated in response to the operating amount of the brake operating member exceeds the servo pressure change threshold value. Accordingly, the target servo pressure is not changed linearly when the vehicle is stopped and the linear valve which generates the pilot pressure does not continuously operate during the vehicle being stopped thereby securing durability of the linear valve.

According to the second aspect of the invention, the target servo pressure under vehicle stopping state setting means sets the servo pressure change threshold by setting a deviation which value is set to be small when the brake operating speed is smaller after the servo pressure calculated in response to the brake operating amount of the brake operating member exceeded the servo pressure change threshold value. Accordingly, the change of operating amount of the brake operating member by the driver of the vehicle is small and the driver does not feel uncomfortable feeling due to a small impact transmitted to the brake operating member generated at the time of change of the reference servo pressure when the driver of the vehicle is sensitive to the impact transmitted to the brake operating member.

According to the third aspect of the invention, the target servo pressure under vehicle stopping state setting means sets the servo pressure change threshold value by setting a deviation which value is set to be large when the time for the servo pressure change threshold value being not changed has passed a predetermined defined time after the servo pressure change threshold value set based on the deviation in case the deviation is' set to be smaller than the reference. The reference servo pressure change becomes less frequent due to a large deviation being set. The linear valve is then not so frequently operated to keep the durability thereof.

BRIEF EXPLANATION OF THE ATTACHED DRAWINGS

These and other features of the invention will become more apparent from the following detailed description of the embodiments with reference to the attached drawings, in which.

Figure 1:
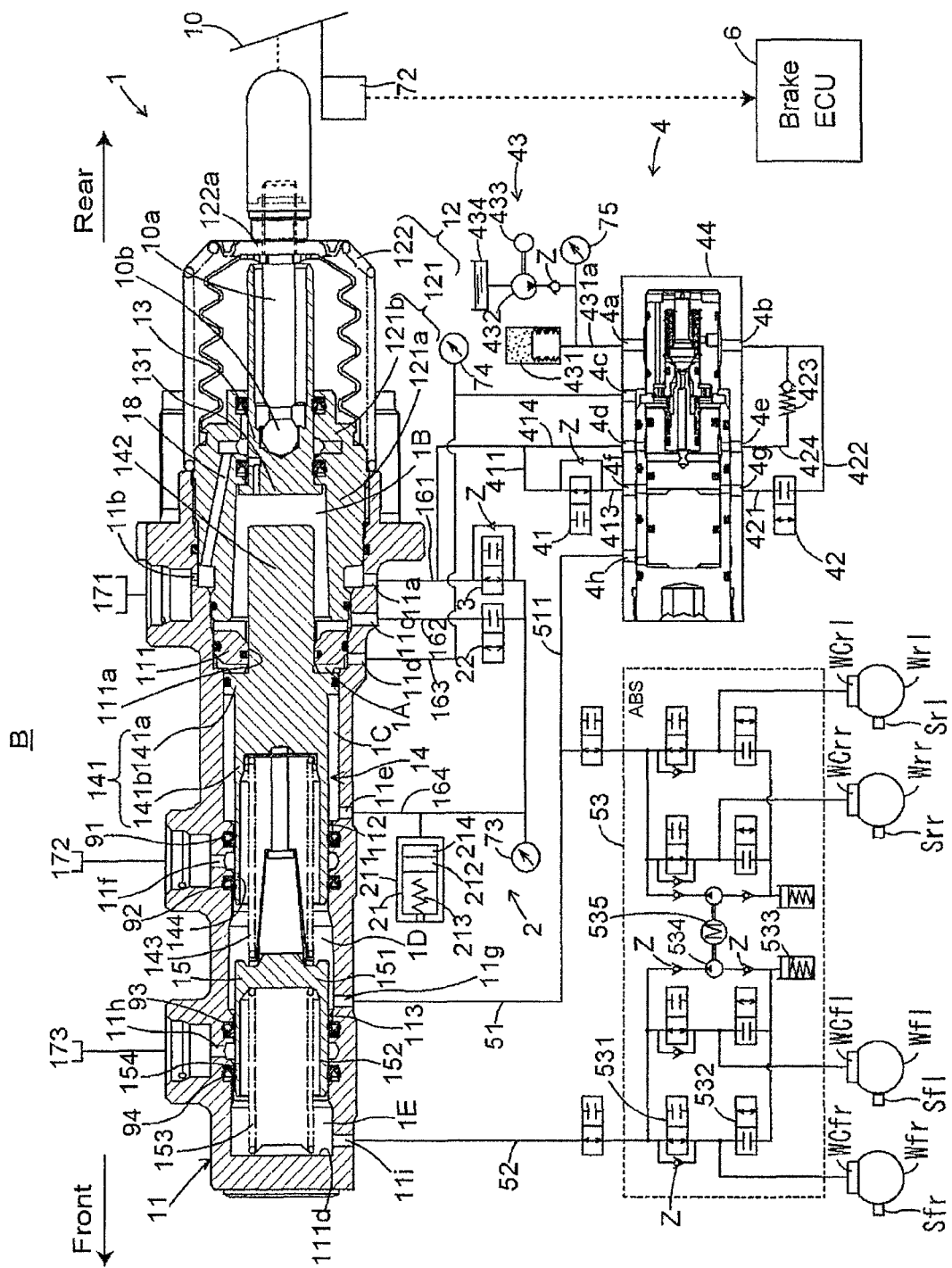
FIG. 1 is a partially sectioned explanatory view indicating a vehicle brake device according to an embodiment of the invention.

THE EMBODIMENTS FOR IMPLEMENTING THE INVENTION (Explanation of Hybrid Vehicle)

The embodiment of the invention will be explained hereinafter with reference to the attached drawings. The hybrid vehicle (hereinafter, simply called as a "vehicle") on which a friction brake device B (vehicle brake device) is mounted, is a vehicle which drives the drive wheel, such as for example, front right/left wheels Wfr, Wfl by an engine or motor/generator (both are not shown in the drawings). A regeneration brake device is formed by the motor/generator. The regeneration brake device generates a regeneration braking force based on later explained "target regeneration braking force" at the front right/left wheels Wfr, Wfl by the motor/generator. It is noted that the motor/generator may be formed by separated two members, motor and generator.

A brake disc rotated together with each wheel Wfr, Wfl, Wrr and Wrl and a friction brake generating a friction braking force by pushing a brake pad onto the disc brake are provided adjacent to each wheel. Each friction brake includes a wheel cylinder WCfr, WCfl, WCrr and WCrl which pushes the brake pad onto the brake pad by a master pressure generated in a later described master cylinder device 1 (See FIG. 1).

(Explanation of Vehicle Brake Device)

The friction brake device B (vehicle brake device) according to the embodiment includes mainly a master cylinder device 1, a reaction force generating device 2, a separation lock valve 22, reaction force valve 3, servo pressure generating device 4, a brake ECU 6 and various sensors 72 through 75 which are electrically communicable with the brake ECU 6.

The friction brake device B is provided with a vehicle speed sensor Sfr, Sfl, Srr and Srl adjacent each wheel Wfr, Wfl, Wrr and Wrl and each sensor outputs a pulse signal with frequency corresponding to the rotation of each wheel Wfr, Wfl, Wrr and Wrl to the brake ECU 6.

(Explanation of Master Cylinder)

As shown in FIG. 1, the master cylinder device 1 is connected to each wheel cylinder WCfr, WCfl, WCrr and WCrl via conduits 51 and 52 and ABS actuator 53. The master cylinder device 1 supplies each wheel cylinder WCfr, WCfl, WCrr and WCrl with a brake fluid via the ABS actuator 53. The master cylinder device 1 includes mainly a main cylinder 11, a cover cylinder 12, an input piston 13 and a first master piston 14 and a second master piston 15.

The main cylinder 11 is formed to be approximately of a cylindrical shape with one end being open and the other end being closed having a bottom surface. It is noted here that the open end side of the main cylinder 11 of the master cylinder device 1 is referred to as a rear side and the closed end side (bottom surface end side) is referred to as a front side. The main cylinder 11 includes an inner cylindrical wall portion 111 inside of the cylinder to separate the inside of the cylinder into two parts, open end side and bottom surface end side. A penetration bore 111a is provided at the central portion of the inner cylindrical wall portion 111 and penetrating therethrough in an axial direction (in a front/rear direction) relative to the main cylinder 11.

The main cylinder 11 is provided with a portion 112 (rear side) and a portion 113 (front side) inside of the cylinder and at a frontward portion relative to the inner cylindrical wall portion 111. Each portion has a small diameter portion 112, 113 with an inner diameter smaller than the inner diameter of the inner cylindrical wall portion 111. In other words, small diameter portions 112 and 113 are formed partially in an axial direction and over the entire periphery of the inner peripheral surface of the main cylinder 11 and extending from the inner surface thereof. Master pistons 14 and 15, which will be later explained in detail, are slidably disposed in series inside of the main cylinder 11 in an axial direction. Ports provided on the cylinder for fluid communication between the inside and the outside of the master cylinder device 1 will be also later explained in detail.

The cover cylinder 12 includes a cylindrical portion 121 and a U-shaped cover portion 122. The cylindrical portion 121 is disposed in the rear side of the main cylinder 11 and co-axially inserted into the opening of the main cylinder 11. The inner diameter of the front side portion 121a of the cylindrical portion 121 is larger than the inner diameter of the rear side portion 121b of the cylindrical portion 121. Further, the inner diameter of the front side portion 121a is larger than the inner diameter of the penetration bore 111a of the inner cylindrical wall portion 111.

The cover portion 122 of the cover cylinder 12 is assembled on the outer peripheral surface of the cylindrical portion 121 and the rear end portion of the main cylinder 11 so that the opening of the main cylinder 11 and the rear end side opening of the cylindrical portion 121 can be closed thereby. A penetration bore 122a is formed on the bottom wall of the cover portion 122. The cover portion 122 is made from an elastic material and is extendable or contractible in an axial direction and the bottom wall thereof is biased in rearward The input piston 13 is slidably disposed within the cover cylinder 12 in response to the operation (depression) of a brake pedal 10. The input piston 13 is formed to be of a cylindrical shape with a bottom surface at a front side and an opening at a rear side. A bottom wall 131 forming the bottom surface of the input piston 13 has a diameter larger than the diameters of any other portions of the input piston 13. The bottom wall 131 of the input piston 13 is arranged to be positioned at a rear end of the front portion of the cylindrical portion 121. The input piston 13 is axially slidably and liquid-tightly disposed in the rear portion 121b of the cylindrical portion 121.

An operation rod 10a and a pivot 10b of the brake pedal 10 are operatively connected to the input piston 13. One end of the operation rod 10a is extending outwardly from the master cylinder device 1 through the opening of the input piston 13 and the penetration bore 122a of the cover portion 122 and is operatively connected to the brake pedal 10. The operation rod 10a moves in response to the operation of the brake pedal 10 and moves forward contracting the cover portion 122 in an axial direction when the brake pedal 10 is depressed. Together with the forward movement of the operation rod 10a, the input piston 13 also moves forward.

The first master piston 14 is axially slidably disposed in the main cylinder 11 and more particularly, the first master piston 14 is formed by a first main body portion 141 and a projection portion 142. The first main body portion 141 is co-axially disposed within the main cylinder 11 in the front side of the inner cylindrical wall portion 111. The first main body portion 141 includes an opening at a front side and a servo pressure receiving portion 141a at a rear side and is formed to be of approximately a cylindrical shape. In other words, the first main body portion 141 is formed by the bottom wall 141a and a peripheral wall portion 141b.

The servo pressure receiving portion 141a is axially slidably and liquid-tightly disposed in the main cylinder 11 at the front side of the inner cylindrical wall portion 111. The peripheral wall portion 141b is formed to be of cylindrical shape, the diameter of which is smaller than the diameter of the servo pressure receiving portion 141a and extends co-axially from the central portion of the front end surface of the servo pressure receiving portion 141a to frontward. The front portion of the peripheral wall portion 141b is axially slidably and liquid-tightly disposed in the small diameter portion 112. The rear portion of the peripheral wall portion 141b is separated from the inner peripheral surface of the main cylinder 11.

The projection portion 142 of the first master piston 14 is of columnar shape projecting from the central portion of the end surface of the servo pressure receiving portion 141a of the first main body portion 141 in a rear direction and disposed axially slidably and liquid-tightly disposed in the penetration bore 111a of the inner cylindrical wall portion 111. The rearward portion of the projection portion 142 is positioned inside of the cylindrical portion 121 through the penetration bore 111a. Further, the rearward portion of the projection portion 142 is separated from the inner peripheral surface of the cylindrical portion 121. The rear end surface of the projection portion 142 is separated from the bottom wall 131 of the input piston 13 by a predetermined distance. The first master piston 14 is biased by a biasing member 143 formed by a spring material in a rearward direction.

It is noted here that the servo chamber 1A is delimited by the rear end surface of the servo pressure receiving portion 141a of the first main body portion 141, front end surface of the inner cylindrical wall portion 111, the inner peripheral surface of the main cylinder 11 and the outer peripheral surface of the projection portion 142. Further, the separation chamber 1B is delimited by the rear end surface of the inner cylindrical wall portion 111, an outer surface of the input piston 13, inner peripheral surface of the front portion 121a of the cylindrical portion 121 and the outer surface of the projection portion 142. The reaction force chamber 1C is delimited by the front end surface of the servo pressure receiving portion 141a, rear end surface (including a sealing member 91) of the small diameter portion 112, outer surface of the peripheral wall portion 141b and inner peripheral surface of the main cylinder 11.

The second master piston 15 is co-axially disposed within the main cylinder 11 at the front side. The second master piston 15 includes an opening at a front side and a bottom wall 151a at a rear side and is formed to be of approximately a cylindrical shape. In other words, the second master piston 15 is formed by the bottom wall 151 and the peripheral wall portion 152 the diameter of which is the same as the diameter of the bottom wall 151. The bottom wall 151 is disposed between the small diameter portions 112 and 113 at the front side of the first master piston. The rear end portion including the bottom wall 151 of the second master piston 15 is separated from the inner peripheral surface of the main cylinder 11. The peripheral wall portion 152 is of cylindrical shape and extends co-axially from the bottom wall 151 in a frontward direction. The peripheral wall portion 152 is axially slidably and liquid-tightly disposed in the small diameter portion 113. The second master piston 15 is biased in a rearward direction by a biasing member 153 formed by a spring material.

It is noted here that the first master chamber 1D is delimited by the outer surface of the second master piston 15, front end surface of the first master piston 14, inner surface of the first master piston, the front end surface (including a sealing member 92) of the small diameter portion 112, the rear end surface (including the sealing member 93) of the small diameter portion 113 and the inner peripheral surface of the main cylinder 11 between the small diameter portions 112 and 113. The second master chamber 1E is delimited by inner bottom surface 111d of the main cylinder 11, front end surface of the second master piston 15, inner surface of the second master piston 15, front end surface (including the sealing member 94) of the small diameter portion 113 and the inner peripheral surface of the main cylinder 11.

The area of the rear end surface of the servo pressure receiving portion 141a (the area facing the servo chamber 1A) is set to be larger than the area of front end surface of the peripheral wall portion 141b (the area facing the first master chamber 1D)

The master cylinder device 1 is provided with a plurality of ports 11a through 11i which are served as the fluid communication passage between the inside and outside of the master cylinder device 1. The port 11a is formed on the main cylinder 11 at rear side portion relative to the inner cylindrical wall portion 111. The port 11b is formed on the main cylinder 11 at the same position with the port 11a in an axial direction and is positioned facing the port 11a. The port 11a and the port 11b are in fluid communication through a space formed between the inner peripheral surface of the main cylinder 11 and the outer peripheral surface of the cylindrical portion 121. The port 11a is connected to a conduit 161, whereas the port 11b is connected to a reservoir 171. Accordingly, the port 11a is in fluid communication with the reservoir 171 via the port 11b.

The port 11b is also in fluid communication with the separation chamber 1B through a passage 18 formed on the cylindrical portion 121 and the input piston 13. This passage 18 is closed when the input piston 13 advances forward. Accordingly, the fluid communication between the separation chamber 1B and the reservoir 171 is interrupted upon such forward movement of the input piston 13.

The port 11c is formed on the main cylinder 11 at a position ahead of the port 11a. The port 11c connects the separation chamber 1B with a conduit 162. The port 11d is formed on the main cylinder 11 at a position ahead of the port 11c and connects the servo chamber 1A with a conduit 163. The port 11e is formed on the main cylinder 11 at a position ahead of the port 11d and connects the reaction force chamber 1C with a conduit 164.

The port 11f is formed on the small diameter portion 112 of the main cylinder 11 and is positioned between the sealing members 91 and 92. The port 11f connects a reservoir 172 with the inside space of the main cylinder 11. The port 11f is in fluid communication with the first master chamber 1D through a passage 144 formed on the first master piston 14. The passage 144 of the first master piston 14 is formed at a position somewhat rearward of the sealing member 92 under non-operation condition so that the fluid communication between the first master chamber 1D and the port 11f is interrupted by the sealing member 92 when the first master piston 14 advances forward.

The port 11g is formed on the main cylinder 11 at a position ahead of the port 11f on the small diameter portion 112 and connects the first master chamber 1D with a conduit 51. The port 11h is formed on the small diameter portion 113 of the main cylinder 11 and is positioned between the sealing members 93 and 94. The port 11h connects a reservoir 173 with the inside space of the main cylinder 11. The port 11g is in fluid communication with the second master chamber 1E through a passage 154 formed on the second master piston 15. The passage 154 of the second master piston 15 is formed at a position somewhat rearward of the sealing member 94 under non-operation condition so that the fluid communication between the second master chamber 1E and the port 11g is interrupted by the sealing member 94 when the second master piston 15 advances forward. The port 11i is formed on the main cylinder 11 and positioned ahead of the port 11h and connects the second master chamber 1E with a conduit 52.

Sealing members formed of, such as O-ring are provided in the master cylinder 1 at the positions where necessary (indicated with black circles in the drawings). The sealing members 91 and 92 are provided on the small diameter portion 112 and are liquid-tightly in contact with the outer peripheral surface of the first master piston 14. Similarly, the sealing members 93 and 94 are provided on the small diameter portion 113 and are liquid-tightly in contact with the outer peripheral surface of the second master piston 15. Further, sealing members are provided between the input piston 13 and the cylindrical portion 121 for sealing therebetween.

The stroke sensor 72 is provided adjacent to the brake pedal 10. The stroke sensor is a sensor which detects the operating amount (pedal depression amount) of the brake pedal 10 and the detection results are sent to the brake ECU 6. It is noted that the brake pedal 10 is connected to the rear end of the input piston 13 and accordingly, as the result, the stroke sensor 72 detects the displacement amount in an axial line direction of the input piston 13 (position in axial line).

(Reaction Force Generating Device 2)

The reaction force generating device 2 is provided with a stroke simulator 21. The stroke simulator 21 generates a reaction force pressure in the separation chamber 1B and the second reaction force chamber 1C in response to the depression of the brake pedal 10 by the operator in order to reproduce the brake operating feeling (pedal depression feeling) for the operator. Generally, the stroke simulator 21 is structured by a cylinder 211, a piston 212 disposed in the cylinder and slidably movable within the cylinder, a compression spring 213 disposed in the cylinder 211 for biasing the piston in an axial direction and a pilot fluid chamber 214 formed in the cylinder 211 at one side of the piston 212. The stroke simulator 21 is connected to the reaction force chamber 1C via the conduit 164 and the port 11e and further connected to the separation lock valve 22 and the reaction force valve 3. A hydraulic pressure is generated in the reaction force chamber 1C in response to the stroke position of the first master piston 14. In other words, it can be said that the hydraulic pressure in response to the displacement of the first master piston 14 is generated in the reaction force chamber 1C.

(Separation Lock Valve 22)

The separation lock valve 22 is a normally closed type electromagnetic valve and the open/close operation is controlled by the brake ECU 6. The separation lock valve 22 is connected to conduits 164 and 162 for establishing/interrupting the fluid communication of the conduits 162 and 164 thereby to establish/interrupt fluid communication between the separation chamber 1B and the reaction force chamber 1C.

The pressure sensor 73 detects mainly the pressure (reaction force pressure) in the first and the second reaction force chambers 1B and 1C and is connected to the conduit 164. The pressure sensor 73 detects the pressures in both first and second reaction force chambers 1B and 1C when the separation lock valve 22 is in open state and detects only the pressure in the reaction force chamber 1C when the separation lock valve 22 is in closed state.

(Reaction Force Valve 3)

The reaction force valve 3 is a normally open type electromagnetic valve and the opening and closing operations are controlled by the brake ECU 6. The reaction force valve 3 is connected to the conduits 164 and 161 for establishing/interrupting fluid communication of the conduits 161 and 164 thereby to establish/interrupt fluid communication between the first and the second reaction force chambers 1B and 1C and the reservoir 171.

(Controlling of Separation Lock Valve & Reaction Force Valve)

Controlling of brake ECU 6 for reaction force valve 3 and the separation lock valve 22 will be explained hereinafter upon brake operating condition. When the brake pedal 10 is depressed, the input piston 13 advances to close the passage 18 to interrupt fluid communication between the reservoir 171 and the separation chamber 1B and at the same time, the brake ECU 6 closes the reaction force valve 3 (open to close) and opens the separation lock valve 22 (close to open). When the reaction force valve 3 is closed the communication between the reaction force chamber 1C and the reservoir 171 is interrupted and when the separation lock valve 22 is opened, the communication between the separation chamber 1B and the reaction force chamber 1C is established. In other words, when the input piston 13 advances and the reaction force valve 3 is closed, the communication of the separation chamber 1B and the reaction force chamber 1C with the reservoir 171 is interrupted. Then the fluid amount equal to the flow amount flown from or to the separation chamber 1B via the projection portion 142 in response to the displacement of the first master piston 14 is flown in or flown out of the reaction force chamber 1C. The stroke simulator 21 generates reaction force pressure in response to the stroke amount in the separation chamber 1B and the reaction force chamber 1C. This means that the stroke simulator 21 applies a reaction force pressure to the brake pedal 10 which is connected to the input piston 13 in response to the stroke of the input piston 13.

The area of the tip end surface of the projection portion 142 and the area of servo pressure receiving portion 141a servo pressure receiving portion 141a facing to the reaction force chamber 1C are the same and accordingly, the internal pressures in the separation chamber 1B and the reaction force chamber 1C are the same when the reaction force valve 3 is closed and the separation lock valve 22 is open. Thus, the force applied to the tip end surface of the projection portion 142 by the reaction force pressure in the separation chamber 1B and the force applied to the surface facing to the reaction force chamber 1C by the reaction force pressure in the reaction force chamber 1C become the same value and accordingly, even the operator of the vehicle depresses on the brake pedal 10 to increase the internal pressures in the separation chamber 1B and the reaction force chamber 1C, the first master piston 14 does not move. Further, since the area of the tip end surface of the projection portion 142 and the area of servo pressure receiving portion 141a servo pressure receiving portion 141a facing to the reaction force chamber 1C are the same, even if the first master piston 14 moves, the fluid amount to be introduced into the stroke simulator 21 is unchanged and accordingly, the reaction force pressure in the separation chamber 1B is unchanged. Thus, the reaction force to be transmitted to the brake pedal 10 is unchanged.

(Servo Pressure Generating Device 4)

The servo pressure generating device 4 is mainly formed by a pressure decrease valve 41, a pressure increase valve 42, a pressure supply portion 43 and a regulator 44. The pressure decrease valve 41 is a normally open type electromagnetic valve and the flow rate thereof is controlled by the brake ECU 6. One port of the pressure decrease valve 41 is connected to the conduit 161 via the conduit 411 and the other port is connected to the conduit 413. Accordingly, the pressure decrease valve 41 is, on one hand, connected to the reservoir 171 via conduits 411 and 161 and ports 11a and 11b. The pressure increase valve 42 is a normally closed type electromagnetic valve and one port thereof is connected to the conduit 421 and the other port thereof is connected to the conduit 422.

The pressure supply portion 43 supplies the regulator 44 with a high pressure brake fluid upon receipt of instructions from the brake ECU 6. The pressure supply portion 43 is formed mainly by an accumulator 431, a hydraulic pump 432, a motor 433 and a reservoir 434.

The accumulator 431 of the pressure supply portion 43 accumulates the hydraulic pressure generated by the hydraulic pump 432 and is connected to the regulator 44, a pressure sensor 75 and the hydraulic pump 432. The hydraulic pump 432 is connected to the motor 433 and the reservoir 434. The hydraulic pump 432 supplies the accumulator 431 with a brake fluid reserved in the reservoir 434 upon driving operation of the motor 433. The pressure sensor 75 detects the pressure in the accumulator 431.

When the pressure sensor 75 detects that the pressure in the accumulator 431 is decreased to a predetermined value or less, the motor 433 is driven upon receipt of the control signal from the brake ECU 6 and then the hydraulic pump 432 supplies the accumulator 431 with brake fluid to supplement pressure energy to the accumulator 431.

Figure 2:
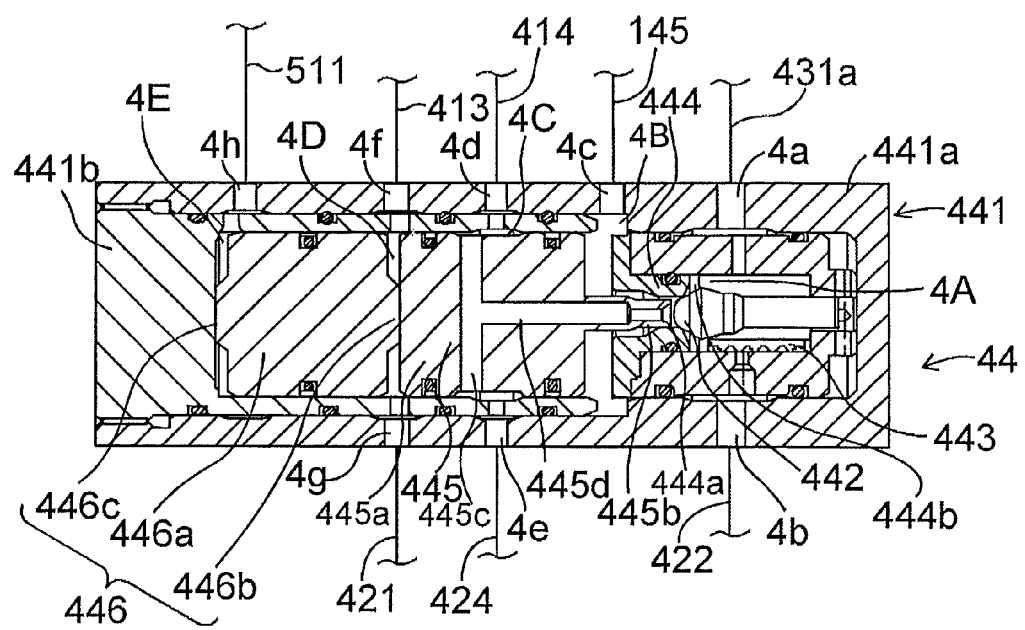
FIG. 2 is a cross sectional view of the regulator according to the embodiment.

The regulator 44 of this embodiment includes a sub piston 446 in addition to a general type regulator. In other words, as shown in FIG. 2, the regulator 44 is provided mainly with a cylinder 441, a ball valve 442, a biasing portion 443, a valve seat portion 444, a control piston 445 and the sub piston 446.

The cylinder 441 is formed by a cylinder case 441a of approximately cylindrical shape having a bottom surface at one end (right side in FIG. 2) and a cover member 441b for closing an opening (left side in FIG. 2) of the cylinder case 441a. For explanatory purpose, the cross section of the cover member 441b is indicated as a U-shape. However, according to this embodiment, the cover member 441b is of columnar shape and a portion closing the opening of the cylinder case 441a is referred to as the cover member 441b. A plurality of ports 4a through 4h is formed on the cylinder case 441a for fluid communication between inside and outside of the cylinder 441.

The port 4a is connected to the conduit 431a and the port 4b is connected to the conduit 422. The port 4c is connected to the conduit 163 through a conduit 145 and the port 4d is connected to the conduit 161 through a conduit 414. The port 4e is connected to a conduit 424 which is connected to the conduit 422 through a relief valve 423. The port 4f is connected to the conduit 413 and the port 4g is connected to a conduit 421. The port 4h is connected to a conduit 511 which is eventually connected to the conduit 51.

The ball valve 442 is of a ball type valve disposed in the cylinder 441 at the bottom surface side of the cylinder case 441a (also referred to as cylinder bottom surface side). The biasing portion 443 is made by a spring which biases the ball valve 442 towards the opening side of the cylinder case 441a (also referred to as cylinder opening side). The biasing portion 443 is disposed at the bottom surface of the cylinder case 441a. The valve seat portion 444 is a wall portion provided on the inner peripheral surface of the cylinder case 441a. The valve seat portion 444 delimits the inside of the cylinder into two parts, cylinder opening side and the cylinder bottom surface side. A penetration bore 444a is provided at the central portion of the valve seat portion 444 to establish fluid communication between the delimited two parts, cylinder opening side and the cylinder bottom surface side. The valve seat portion 444 holds the ball valve 442 from the cylinder opening side to close the penetration bore 444a by the spring biased ball valve 442.

A first chamber 4A is a space delimited by the ball valve 442, the biasing portion 443, the valve seat portion 444 and the inner peripheral surface of the cylinder case 441a at the cylinder bottom surface side. The first chamber 4A is filled with the brake fluid and is connected to the conduit 431a through the port 4a. Further, the first chamber 4A is connected to the conduit 422 via the port 4b.

The control piston 445 includes a columnar shaped main body portion 445a and a columnar shaped projecting portion 445b having a diameter smaller than the diameter of the main body portion 445a. The main body portion 445a is co-axially and liquid-tightly disposed in the inside of the cylinder 441 at the cylinder opening side of the valve seat portion 444 and is movable in an axial direction. The main body portion 445a is biased by a biasing means (not shown) towards the cylinder opening side and is provided with a passage 445c at an axially central portion. Both sides of the passage 445c are open to the peripheral surface of the main body portion 445a. The passage 445c extends in a peripheral direction (up/down direction as viewed in FIG. 2). A part of the inner peripheral surface of the cylinder 441 corresponding to the end openings of the passage 445c is provided with the port 4d and at the same time the part is dented to form a concave portion on the outer peripheral surface of the main body portion 445a. This concave portion and the main body portion 445a define a third chamber 4C.

The projecting portion 445b is projected from the end surface of the cylinder bottom surface side of the main body portion 445a towards the cylinder bottom surface side. The diameter of the projecting portion 445b is smaller than the diameter of the penetration bore 444a. The projecting portion 445b and the penetration bore 444a are in co-axially arranged with each other. The tip end of the projecting portion 445b is separated from the ball valve 442 by a predetermined distance from the cylinder opening side. A passage 445d is formed in the projecting portion 445b and is open to the central portion of the cylinder bottom surface side of the projecting portion 445b. The passage 445d extends in cylinder axial direction towards the inside of the main body portion 445a and is connected to the passage 445c thereof.

A second chamber 4B is formed by a space delimited by the end surface of the cylinder bottom surface side, outer surface of the projecting portion 445b, inner peripheral surface of the cylinder 441, valve seat portion 444 and the ball valve 442. The second chamber 4B is connected to the ports 4d and 4e through the passages 445c and 445d and the third chamber 4C.

The sub piston 446 is formed by a sub main body portion 446a, a first projecting portion 446b and a second projecting portion 446c. The sub main body portion 446a is formed of approximately columnar shape and is disposed in the cylinder 441 at the cylinder opening side of the main body portion 445a. The sub main body portion 446a is coaxially and liquid-tightly disposed in the cylinder 441 and movable in an axial direction.

The first projecting portion 446b is of columnar shape and having a diameter smaller than the sub main body portion 446a. The first projecting portion 446b projects from the central portion of the end surface of the cylinder bottom surface side of the sub main body portion 446a and is in contact with end surface of the cylinder opening side of the main body portion 445a. The second projecting portion 446c is of similar shape with the first projecting portion 446b and is projecting from the central portion of the end surface of the cylinder opening side of the sub main body portion 446a. The second projecting portion 446c is in contact with the cover member 441b.

A pressure control chamber 4D is a space in the cylinder delimited by the end surface of the cylinder bottom surface side of the sub main body portion 446a, outer surface of the first projecting portion 446b, end surface of the cylinder opening side of the control piston 445 and inner peripheral surface of the cylinder 441. The pressure chamber 4D is connected to the pressure decrease valve 41 via the port 4f and the conduit 413 and also is connected to the pressure increase valve 42 via the port 4g and the conduit 421.

On the other hand, a fourth chamber 4E is a space delimited by the end surface of the cylinder bottom surface side of the sub main body portion 446a, outer surface of the second projecting portion 446c, cover member 441b and inner peripheral surface of the cylinder 441. The fourth chamber 4E is connected to the port 11g via port 4h and conduits 511 and 51. The four chambers 4A through 4E are filled with the brake fluid and the pressure sensor 74 detects the pressure in the servo chamber 1A (servo-pressure) and is connected to the conduit 163.

(Brake Piping)

The first master chamber 1D and the second master chamber 1E which generate master cylinder pressure are in fluid communication with the wheel cylinders WCfr, WCfl, WCrr and WCrl via conduits 51 and 52 and ABS (Anti-lock Brake System) actuator 53. In more detail, the port 11g of the first master chamber 1D and the port 11i of the second master chamber 1E are in fluid communication with the ABS actuator 53 which is a well-known anti-lock brake system through conduits 51 and 52, respectively. The wheel cylinders WCfr, WCfl, WCrr and WCrl for controlling the braking of the vehicle wheels Wfr, Wfl, Wrr and Wrl are operatively connected to the ABS actuator 53.

The structure of the ABS actuator 53 will be explained with an example of controlling a front right wheel Wfr of the vehicle wheels Wfr, Wfl, Wrr and Wrl and explanations of the other wheels are omitted. The ABS actuator 53 includes a pressure holding valve 531, a pressure decrease valve 532, a reservoir 533, a pump 534 and a motor 535. The pressure holding valve 531 is a normally open type electromagnetic valve and the opening/closing operation thereof is controlled by the brake ECU 6. The pressure holding valve 531 is connected to the conduit 52 at one end and is connected to the wheel cylinder WCfr and the pressure decrease valve 532 at the other side. The pressure holding valve 531 is an input valve for the ABS actuator 53.

The pressure decrease valve 532 is a normally closed type electromagnetic valve and the opening/closing operation is controlled by the brake ECU 6. One port of the pressure decrease valve 532 is connected to the wheel cylinder WCfr and the pressure holding valve 531 and the other port is connected to the reservoir 533. When the pressure decrease valve 532 becomes in open state, fluid communication between the wheel cylinder WCfr and the reservoir 533 is established.

The reservoir 533 is used for reserving the brake fluid therein and is connected to the conduit 52 via the pressure decrease valve 532 and the pump 534. The pump 534 is connected to the reservoir 533 at the suction port and is connected to the conduit 52 at the discharge port via a check valve Z. It is noted here that the check valve Z is disposed in the conduit to allow the flow from the pump 534 to the conduit 52 (eventually to the second master chamber 1E) but prevents the flow in reverse direction. The pump 534 is driven by the motor 535 which is operated in response to the instructions from the brake ECU 6. The pump 534 suctions the brake fluid in the wheel cylinder 541 or the brake fluid reserved in the reservoir 533 and returns the brake fluid to the second master chamber 1E via the conduit 52 under the pressure decreasing mode in the ABS control operation. Usually, a damper means (not shown in the embodiment) is provided in the upstream side of the pump 534 to suppress the pulsation of the brake fluid ejected from the pump 534.

According to thus structured ABS actuator 53, the ABS control operation (anti-lock brake control operation) is executed by controlling of switching over operation of the electromagnetic valves 531 and 532 and adjusting brake pressure to be applied to the wheel cylinder WCfr, i.e., the braking force to be applied to the vehicle wheel Wfr by driving motor 535 when necessary based on the vehicle condition, such as, the master cylinder pressure, a vehicle wheel speed condition and a front/rear acceleration. The ABS actuator 53 is a device for supplying wheel cylinders WCfr through WCrl with brake fluid supplied from the master cylinder device 1 by adjusting the amount of the brake fluid and timing of supply based on the instructions from the brake ECU 6 (corresponding to the supply fluid pressure adjusting device of the invention).

In the liner control mode, which will be later explained in detail, the hydraulic pressure from the accumulator 431 is controlled by the pressure increase valve 42 and the pressure decrease valve 41 and the servo pressure is generated in the servo chamber 1A to advance the first and the second master pistons 14 and 15 to generate hydraulic pressure in the first and the second master chambers 1D and 1E, respectively. Thus generated pressure is supplied to the wheel cylinders WCfr through WCrl via the ports 11g and 11i, the conduits 51 and 52 and the ABS actuator 53 as the master cylinder pressure and hydraulic braking pressure is applied to the vehicle wheels Wfr through Wrl.

(Brake ECU 6)

The brake ECU 6 is an "Electronic Control Unit" which includes a microcomputer. The microcomputer includes an input/output interface, CPU, RAM, ROM and a memory portion formed by non-volatile memory connected through bus line. The CPU executes a program corresponding to the flowcharts shown in FIGS. 4 and 5. RAM temporarily memorizes the variables necessary for executing the program and the memory portion memorizes the program.

The brake ECU 6 electrically communicates with various sensors 72 through 75 and controls electromagnetic valves 22, 3, 41, 42, 531 and 532 and motors 433 and 535 upon receipt of signals therefrom. The brake ECU 6 is mutually connected to Hybrid ECU (not shown) for executing cooperative control (regeneration cooperative control) of the regeneration braking device and the friction brake device B. The brake ECU 6 memorizes two control modes therein, one is a linear control mode and the other is REG control.

The linear control mode is a normal braking control mode for controlling "the servo pressure" in the servo chamber 1A by controlling the pressure decrease valve 41 and pressure increase valve 42 under the separation lock valve 22 being open and the reaction force valve 3 being closed. In this linear control mode, the brake ECU 6 calculates a required braking force required by an operator of the vehicle based on the operating amount of the brake pedal 10 (displacement of input piston 13) detected by the stroke sensor 72. Then the brake ECU 6 outputs the required braking force of the operator of the vehicle to the hybrid ECU and obtains the target regeneration braking force which is a target value of the regeneration brake device from the hybrid ECU. Then by deducting the target regeneration braking force from the required braking force to obtain the target friction braking force. Based on thus obtained target friction braking force, the brake ECU calculates the target servo pressure and then controls the pressure decrease and increase valves 41 and 42 to conform the friction braking force of the friction braking device B to be the target friction braking force so that the servo pressure of the servo chamber 1A agrees to the target servo pressure.

The REG control mode is a braking control mode in which the pressure decrease valve 41, pressure increase valve 42, the separation lock valve 22 and the reaction force valve 3 are de-energized or de-energized due to failure (mode for keeping normal state).

(Linear Control Mode)

Under the brake pedal 10 being not depressed, the ball valve 442 closes the penetration bore 444a of the valve seat portion 444 and accordingly, the first chamber 4a and the second chamber 4b are in separated condition. The pressure decrease valve 41 is in open state and the pressure increase valve 42 is in closed state.

The second chamber 4b is in communication with the servo chamber 1A via a conduit 163 and both are kept to be in the same fluid pressure state. The second chamber 4B is in communication with the third chamber 4C via the passages 445c and 445d of the control piston 445. Accordingly, the second and third chambers 4B and 4C are in communication with the reservoir 171 through conduits 414 and 161. The pressure control chamber 4D is closed at one end by the pressure increase valve 42 and is in communication with the reservoir 171 via the pressure decrease valve 41. The fluid pressure in the pressure control chamber 4D is the same with the fluid pressure in the second chamber 4B. The fourth chamber 4E is in communication with the first master chamber 1D via the conduits 511 and 51 to keep the same fluid pressure in the chambers 4E and 1D.

Under such condition, when the brake pedal 10 is depressed, after a predetermined regeneration period of time, the brake ECU 6 controls the pressure decrease and pressure increase valves 41 and 42 based on the information from the stroke sensor 72. In other words, the brake ECU 6 controls the pressure decrease valve to be in closing direction and controls the pressure increase valve to be in opening direction.

Upon opening of the pressure increase valve 42, the accumulator 431 and the pressure control chamber 4D establish fluid communication and upon closing of the pressure decrease valve 41, the fluid communication between the accumulator 431 and the pressure control chamber 4D is interrupted. The pressure in the pressure control chamber 4D (pilot pressure) can be increased by supplying high pressure brake fluid from the accumulator 431. When the pressure in the pressure control chamber 4D increases, the control piston 445 slidably moves in a cylinder bottom surface side and when the tip end of the projection portion 445*b* of the control piston 445 contacts with the ball valve 442, the passage 445*d* is closed by the ball valve 442 to thereby interrupt fluid communication between the second chamber 4B and the reservoir 171.

Further, when the control piton 445 slidably moves in a cylinder bottom surface side, the ball valve 442 is pushed by the projection portion 445*b* towards the cylinder bottom surface side to be separated from a valve seat surface 444*b*. Thus, the fluid communication between the second chamber 4B and the first chamber 4A is established through the penetration bore 444*a* of the valve seat portion 444. Since high pressure brake fluid has been introduced into the first chamber 4A from the accumulator 431, the above establishment of fluid communication increases the pressure in the second chamber 4B. In response to the pressure increase in the second chamber 4B, when the force corresponding to the pressure in the chamber 4B which influences on the control piston 445 becomes larger than the force corresponding to the pilot pressure which influences on the control piston 445, the control piston 445 moves in a cylinder opening side to interrupt the fluid communication between the second chamber 4B and the first chamber 4A. According to the above operation, the fluid pressure in the second chamber 4B changes the pressure in response to the pilot pressure. It is also noted that the brake ECU 6 controls the pressure decrease valve 41 as well as the pressure increase valve 42 so that the pilot pressure in the pressure control chamber 4D becomes high as the target friction braking force becomes large. In other words, larger the target friction braking force, higher the pilot pressure becomes and higher the pilot pressure, higher the servo pressure becomes.

In accordance with the pressure increase in the second chamber 4B, the pressure in the servo chamber 4A which is in communication with the second chamber 4B. By the increase of the pressure in the servo chamber 1A, the first master piston 14 advances to increase the pressure in the first master chamber 1D and then the second master piston 15 also advances to increase the pressure in the second master chamber 1E. By the increase of the pressure in the first master chamber 1D, high pressure brake fluid is supplied to the ABS actuator 53 and the fourth chamber 4E. Although the pressure in the fourth chamber 4E increases, the sub piston 446 does not move. This is because the pressure in the pressure control chamber 4D also increases. Thus the high pressure (master pressure) brake fluid is supplied to the wheel cylinders WCfr, WCfl, WCrr and WCrl to operate the friction brake device Bfr, Bfl, Brr and Brl. Thus the vehicle is decelerated by braking operation.

When the brake operation is desired to be released, the pressure decrease valve 41 is opened and the pressure increase valve 42 is closed to establish fluid communication between the pressure control chamber 4D and the reservoir 171. Then the control piston 445 retreats and the brake pedal 10 returns to the position before the pedal is depressed.

(REG Control Mode)

Under the REG control mode, the pressure decrease valve 41, pressure increase valve 42, separation lock valve 22 and reaction force valve 3 are not energized (not controlled). Under this condition, the pressure decrease valve 41 is in open state, the pressure increase valve 41 is in closed state, the separation lock valve 22 is in closed state and the reaction force valve 3 is in open state. This condition (de-energized condition) continues after the brake pedal 10 is depressed.

Under the REG control mode, when the brake pedal 10 is depressed, the input piston 13 advances to close the passage 18 so that the fluid communication between the separation chamber 1B and the reservoir 171 is interrupted. Under this state, since the separation lock valve 22 is in closed state, the separation chamber 1B is in liquid-tightly closed state. However, since the reaction force valve 3 is in open state, the reaction force chamber 1C is in fluid communication with the reservoir 171.

When the brake pedal 10 is further depressed from the above state, the input piston 13 further advances to increase the pressure in the separation chamber 1B and the increased pressure advances the first master piston 14. At this state, since the both pressure decrease and increase valves 41 and 42 are not energized, the servo pressure is not controlled. In other words, the first master piston 14 advances by the force (fluid pressure in the separation chamber 1B) corresponding to the operating force of the brake pedal 10 only. Although the volume of the servo chamber 1A increases, the chamber is in communication with the reservoir 171 through the regulator 44 and accordingly, the brake fluid is supplied thereto from the reservoir 171.

When the first master piston 14 advances, as similar to the case of linear control mode, the pressures in the first master chamber 1D and the second master chamber 1E increase. Due to the increase of the pressure in the first master chamber 1D, the pressure in the fourth chamber 4E also increases. Due to the increase of the pressure in the fourth chamber 4E, the sub piston 446 moves in the cylinder bottom surface side. At the same time, the control piston 445 is pushed by the first projection portion 446*b* and advances in the same direction. The projection portion 445*b* is in contact with the ball valve 442 to move the same in the cylinder bottom surface side. Thus, the fluid communication between the first chamber 4A and the second chamber 4B is established but the fluid communication between the servo chamber 1A and the reservoir 171 is interrupted. then the high pressure brake fluid in the accumulator 431 is supplied to the servo chamber 1A.

Thus, under the REG control mode, when the brake pedal 10 is depressed with a predetermined stroke, the accumulator 431 and the servo chamber 1A establish fluid communication and accordingly without controlling, the servo pressure is increased. The first master piston 14 advances further forward than the stroke corresponding to the brake operation force of the operator of the vehicle. Thus, even under each solenoid valve is in de-energized state, high pressure brake fluid is supplied to the wheel cylinders WCfr, WCfl, WCrr and WCrl via the ABS actuator 53.

Under the REG control mode, the force which advances the first master piston 14 corresponds to the operating force of the brake pedal. The force corresponding to the operating force means that the force which advances the first master piston 14 only by the brake operating force and the force which advances the first master piston 14 by the servo pressure mechanically generated based on the driving of the first master piston 14.

(Anti-Skid Preventing Function & Hill Start Assisting Function)

It is noted that the friction brake device B of the embodiment includes control functions of "Anti-skid preventing function" and "Hill start assisting function" in addition to the ABS controlling function. The anti-skid preventing function is achieved by a mechanism which prevents vehicle skidding keeping the vehicle as stable as possible during swinging movement by adjusting the brake device provided at each wheel when the vehicle unsteadily turns a corner. The detail of this mechanism is explained in, for example, JP2003-237420 A and explanation of the function here is omitted. The hill start assisting function is a function wherein the stopping condition of a vehicle is held by sealing the pressurized brake fluid into the wheel cylinders WCfr, WCfl, WCrr and WCrl by using the solenoid valve when the vehicle is going to start on the hill. This function is explained in JP2004-284383 A and the detail explanation here is omitted.

(Brake Control Upon Vehicle Being Stopped)

Figure 3:
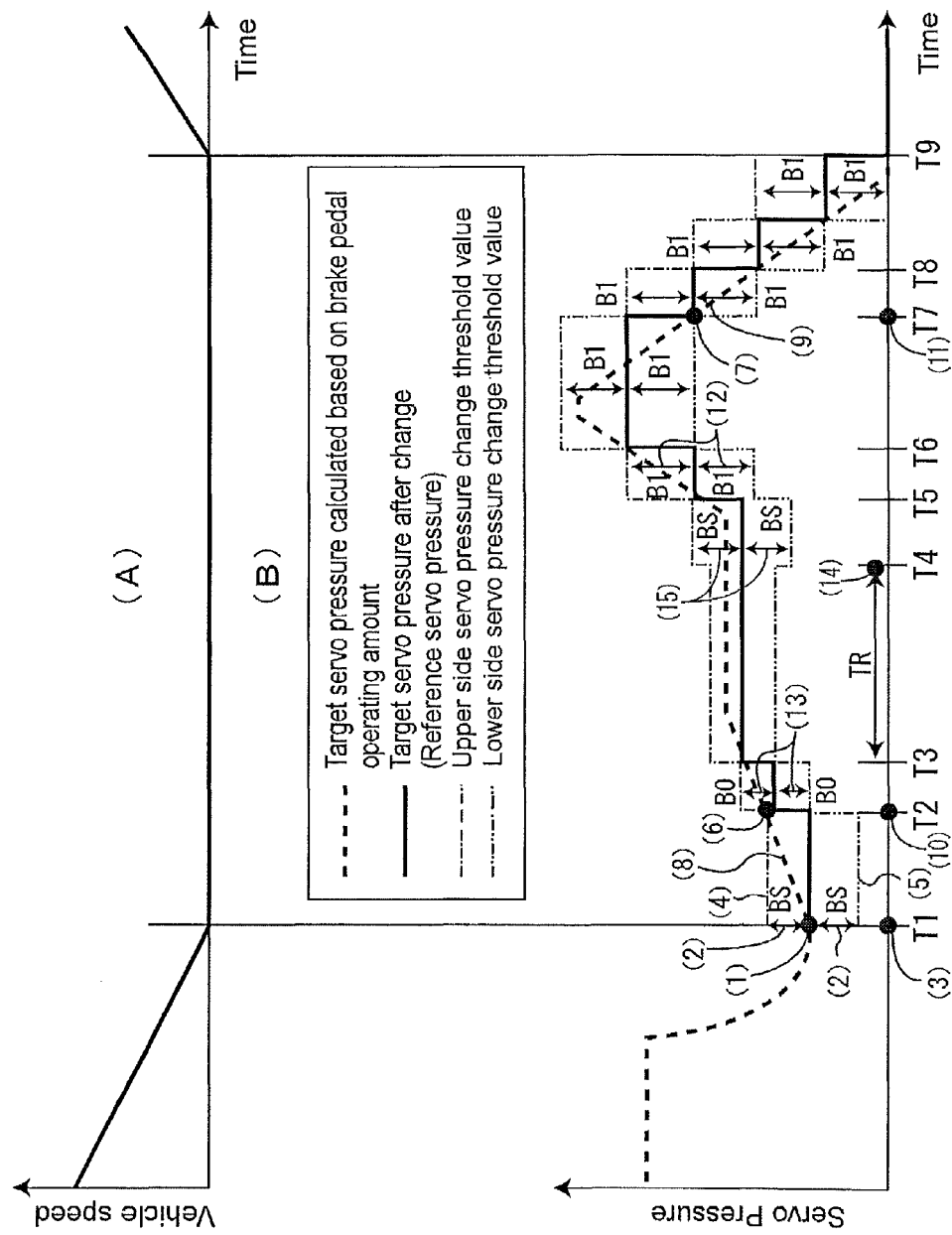
FIG. 3 is a graph having two sections, wherein the section (A) indicates the relationship between the vehicle speed and the time and the section (B) indicates the relationship between the servo pressure and the time is a cross sectional view of the regulator showing that the pilot pressure is applied thereto.

The outline of brake control upon vehicle being stopped which is executed when the vehicle is stopped will be explained with reference to FIG. 3. When a vehicle stops, at the point (1) as shown in FIG. 3, the brake ECU 6 sets the reference servo pressure based on the operating amount of the brake pedal 10 detected by the stroke sensor 72. Then the set reference servo pressure is set to be the target servo pressure. As shown at the points (6) and (7) in FIG. 3, the brake ECU 6 sets the reference servo pressure based on the brake operating amount of the brake pedal 10 when the servo pressure calculated in response to the brake operating amount of the brake pedal 10 exceeds the servo pressure change threshold value (indicated by one-dot chain line or two-dot chain line in FIG. 3) set from the reference servo pressure with a predetermined deviation BS, BO or B1. Then the set reference servo pressure is set to be the target servo pressure.

In summary, during the vehicle being stopped, the target servo pressure (indicated by dot line in FIG. 3) calculated based on the operating amount of the brake pedal 10 is changed to a stepwise changing target servo pressure (indicated by solid line in FIG. 3). In other words, during the vehicle being stopped, a dead zone in the operating amount of the brake pedal 10 is provided so that the target servo pressure may not be changed linearly by limiting the operation frequency of the pressure decrease and increase valves 41 and 42. This can reduce possible frictional wear at the movable portions of the pressure decrease and increase valves 41 and 42 at the vehicle being stopped. Thus the durability of the pressure decrease and increase valves 41 and 42 can be improved. On the other hand, if the target servo pressure changes to exceed the dead zone (points (6) and (7) in FIG. 3), the target servo pressure is changed to be able to respond to such changes so that the delay of restart derived from the discrepancy between the brake pedal operating amount immediately before the restarting of the stopped vehicle and friction braking force can be avoided. Thus, the delay of restart can be avoided which is derived from the delay of brake release at the friction brake device Bfr, Bfl, Brr and Brl at the time of restarting the vehicle by depressing a gas pedal under the brake pedal being released.

(Processing of Target Servo Pressure Setting)

The target servo pressure setting process which realizes the brake control under the vehicle being stopped will be explained hereinafter with reference to the flowchart in FIGS. 4 and 5. When the vehicle is ready for start, and the brake ECU 6 is actuated, at the step S11, the brake ECU 6 as explained above, calculates the braking force based on the operating amount of the brake pedal 10 detected by the' stroke sensor 72 and then calculates the target friction braking force and target servo pressure. Then the program goes to the step S12.

At the step S12, if the brake ECU 6 judges that the ABS controlling, anti-skid preventing operation or hill start assisting operation is under execution (S12; YES) the program goes to step S14. If the brake ECU 6 judges that any of the ABS controlling, anti-skid preventing operation and hill start assisting operation is not executed (S12; NO) the program goes to step S13.

At the step S13, if the brake ECU 6 judges that the vehicle is stopped based on the signals from the vehicle speed sensors Sfr, Sfl, Srr and Srl (S13; YES), the program goes to the step S21 and if the brake ECU 6 judges that the vehicle is not stopped (S13; NO), the program goes to the step S14.

At the step S14, the brake ECU 6 clears the flag (turns to be zero) indicating that the being executed and program goes to the step S15. At the step S15, the brake ECU 6 sets the target servo pressure to be the same as the target servo pressure calculated at the step S11. After the target servo pressure is set, the brake ECU 6 controls the pressure decrease and increase valves 41 and 42 so that the servo pressure in the servo chamber 1A corresponds to the target servo pressure. After the step s15, the program returns to the step S11.

At the step S21, if the brake ECU 6 judges that the flag of the brake control under vehicle being stopped is cleared (turns to be zero) (step S21 YES), the program goes to the step S22 and if the brake ECU 6 judges that the flag of the brake control under vehicle being stopped is not cleared (maintains 1) (step S21 NO), the program goes to the step S25.

At the step S22, the brake ECU 6 calculates and sets the reference servo pressure which is the target servo pressure immediately after the vehicle stopped (point (1) in FIG. 3). In more detail, the brake ECU calculates the required braking force based on the operating amount of the brake pedal 10 detected by the stroke sensor 72 immediately after the vehicle stopped and agrees the required braking force to the target friction braking force and then calculates the target servo pressure from the target friction braking force. Then the brake ECU 6 agrees the target servo pressure to the reference servo pressure. It is noted that when the vehicle is stopped, no regeneration braking force is generated and thus the required braking force agrees to the target friction braking force. After the execution at the step S22 finished, then the program goes to the step S23.

At the step S23, as shown at the point (2) in FIG. 3, the brake ECU 6 sets the servo pressure change deviation BS and the program goes to the step S24. At the step S24, as shown at the point (3) in FIG. 3, the brake ECU 6 clears the timer to be zero to start the timer T1 and the program goes to the step S25. At the step S25, the brake ECU 6 turns the flag of brake control under the vehicle being stopped being under execution to be 1 and the program goes to the step S26.

At the step S26, as shown at the line (4) in FIG. 3, the brake ECU 6 sets the lower side servo pressure change threshold value by adding the servo pressure change threshold value (set at the steps S23, S47, S48 and S53) to the reference servo pressure (set at the steps S22 and S43). Then the program goes to the step S27.

At the step S27, as shown at the line (5) in FIG. 3, the brake ECU 6 sets the upper side servo pressure change threshold value by deducting the servo pressure change threshold value (set at the steps S23, S47, S48 and S53) from the reference servo pressure (set at the steps S22 and S43). Then the program goes to the step S28.

At the step S28, if the brake ECU 6 judges that the target servo pressure calculated based on the operating amount of the brake pedal 10 detected by the stroke sensor 72 has exceeded the upper side servo pressure change threshold value (set at the step S26) (S28; YES) (point (6) in FIG. 3), the program goes to the step S41 and if the brake ECU 6 judges that the target servo pressure has not exceeded the upper side servo pressure change threshold value (set at the step S26) (S28; NO), the program goes to the step S29.

At the step S29, the brake ECU 6 judges that the target servo pressure calculated based on the operating amount of the brake pedal 10 detected by the stroke sensor 72 falls below the lower side servo pressure change threshold value (set at the step S27) (S29; YES) (point (7) in FIG. 3), the program goes to the step S42 and if the brake ECU 6 judges that the target servo pressure does not fall below the lower side servo pressure change threshold value (set at the step S27) (S29; NO), the program goes to the step S51.

At the step S41, the brake ECU 6 calculates the target servo pressure change speed (inclination (8) of dotted line in FIG. 3) by time-differentiating the target servo pressure calculated based on the operating amount of the brake pedal 10 detected by the stroke sensor 72 and then the program goes to the step S43. It is noted that the target servo pressure change speed is a speed correlating with the speed change of the brake operating amount of the brake pedal 10 (brake operating speed) detected by the stroke sensor 72.

At the step S42, the brake ECU 6 calculates the target servo pressure change speed (inclination (9) of dotted line in FIG. 3) by time-differentiating the target servo pressure calculated based on the operating amount of the brake pedal 10 detected by the stroke sensor 72 and then the program goes to the step S43.

At the step S43, the brake ECU 6 sets the target servo pressure calculated based on the operating amount of the brake pedal 10 detected by the stroke sensor 72 by changing to the reference servo pressure and the program goes to the step S44. In other words, as indicated at the point (6) in FIG. 3, the target servo pressure which exceeded the upper side servo pressure change threshold value is changed to the reference servo pressure and as indicated at the point (7) in FIG. 3, the target servo pressure which falls below the lower side servo pressure change threshold value is changed to the reference servo pressure.

At the step S44, as indicated at the points (10) and (11) in FIG. 3, the brake ECU 6 clears (turns to zero) the timer to start the timer T2 and timer T7. Then the program goes to the step S45.

At the step S45, when the brake ECU 6 judged that the target servo change speed (calculated at the steps S41 and S42) exceeds the upper side reference value (S45; YES), the program goes to the step S47 and when the brake ECU 6 judges that the target servo change speed falls below the upper side reference value (S45; NO), the program goes to the step S46.

At the step S46, when the brake ECU 6 judged that the target servo change speed (calculated at the steps 341 and S42) falls below the lower side reference value (S46; YES), the program goes to the step S48 and when the brake ECU 6 judges that the target servo change speed falls below the lower side reference value (S46; NO), the program goes to the step S61.

At the step S47, as indicated by the values (12) in FIG. 3, the brake ECU 6 changes the previous servo pressure change deviation to the servo pressure change deviation B1 and the program goes to the step S61. It is noted that the servo pressure change deviation B1 is set to be larger than the first time set servo pressure change deviation BS set at the step S23, At the step S48, as indicated by the values (13) in FIG. 3, the brake ECU 6 changes the previous servo pressure change deviation to the servo pressure change deviation B0 and the program goes to the step S61. It is noted that the servo pressure change deviation B0 is set to be smaller than the first time set servo pressure change deviation BS set at the step S23, At the step S51, the brake ECU 6 increments the timer (set at the steps S24 and S44) and program goes to step S52. It is noted that in this embodiment, the timer is incremented every three (3) millimeter seconds at the step S51.

At the step S52, as shown at the point (14) in FIG. 3, when the brake ECU 6 judges that the timer exceeds a predetermined time TR (S52; YES), the program goes to the step S53 and when the brake ECU 6 judges that the timer does not exceed the predetermined time TR (S52; NO), the program goes to the step S61.

At the step S53, as indicated by the values (15), the brake ECU 6 changes the previous servo pressure change deviation to the servo pressure change deviation BS and the program goes to the step S61.

At the step S61, the brake ECU 6 sets the current reference servo pressure (set at the steps S22, and S43) as the target servo pressure and the program return to the step S11.

(Effects of the Embodiments)

Figure 4:
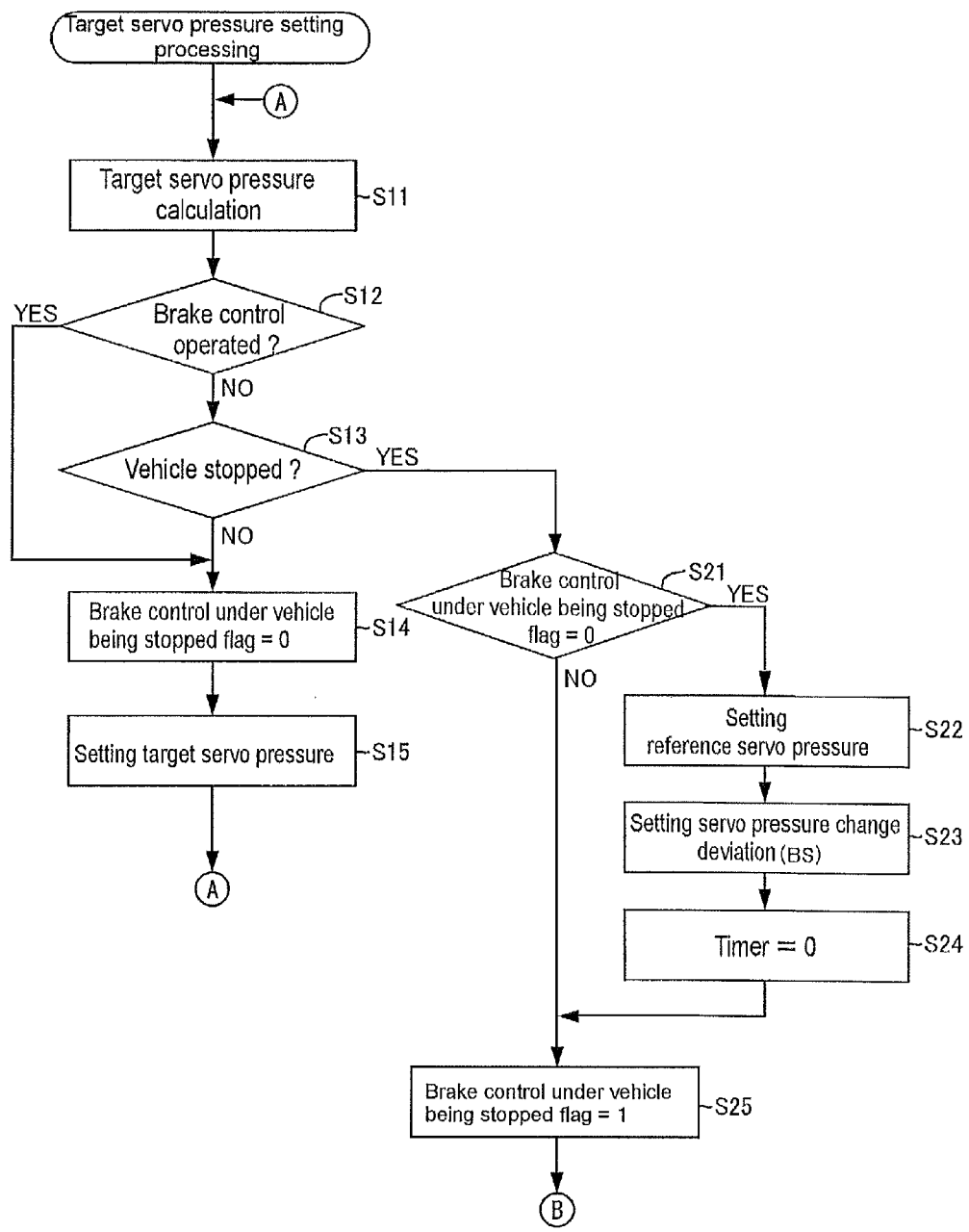
FIG. 4 is a flowchart for target servo pressure setting processing which is a control program executed by the brake ECU indicated in FIG. 1.
Figure 5:
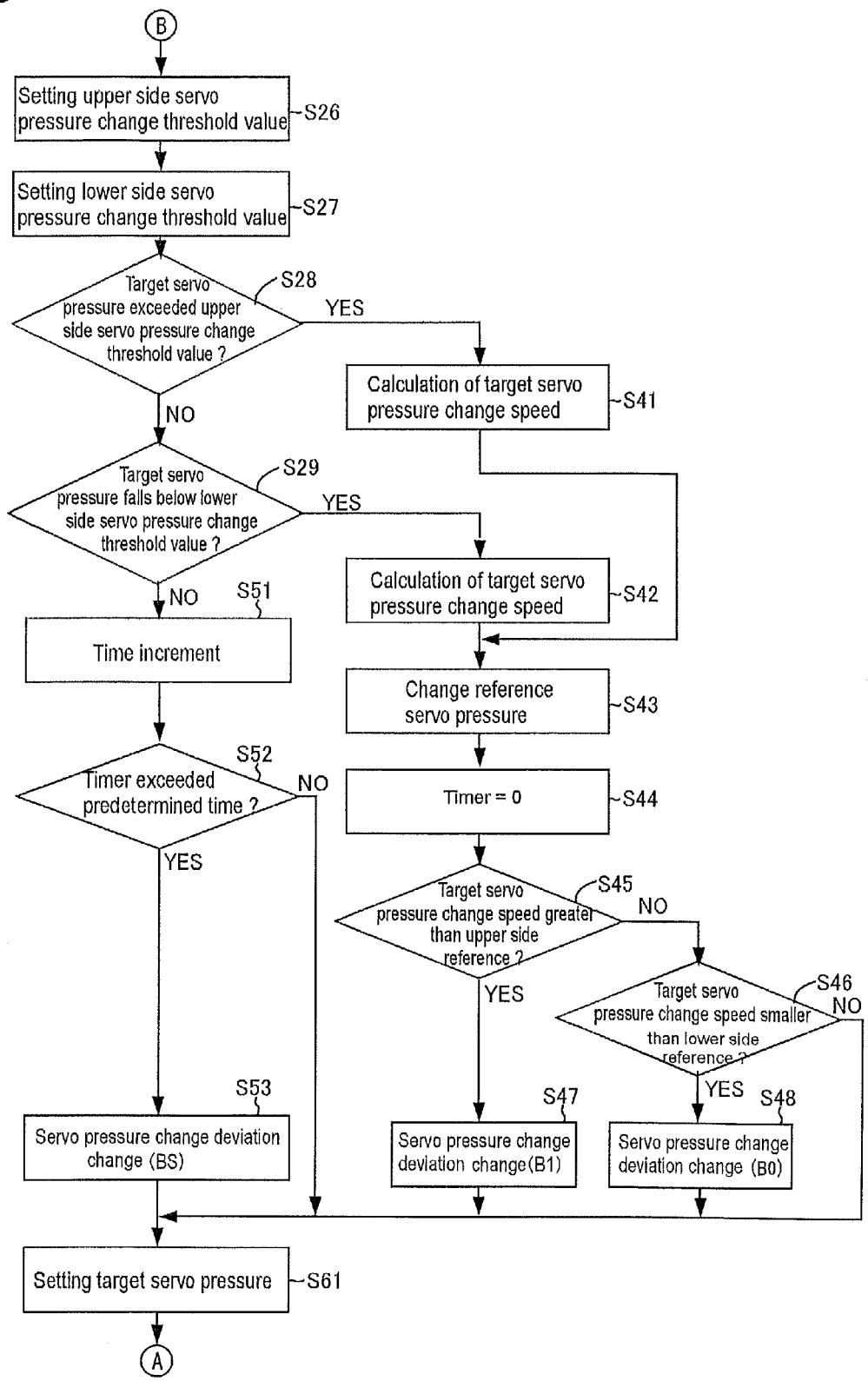
FIG. 5 is a flowchart for target servo pressure setting processing which is a control program executed by the brake ECU indicated in FIG. 1.

As explained above, the brake ECU 6 (target servo pressure under vehicle stopping state setting means) sets the reference servo pressure based on the operating amount of the brake pedal 10 (brake operating member) (point (1) in FIG. 3 and step S22 in FIG. 4) and sets the target servo pressure based on the reference servo pressure during one braking operation (step S61 in FIG. 5). Thus, since the reference servo pressure is not linearly changed, the target servo pressure is not changed linearly. This can stop the continuous operation of the pressure decrease valve 41 and the pressure increase valve 42 (linear valves) which generate pilot pressure during the vehicle being stopped. This can prevent the movable portions of the valves during the vehicle being stopped from wearing out to secure the durability of the valves 41 and 42. It is noted that one braking operation means that the braking operation from the brake pedal 10 being depressed to the brake pedal 10 being released.

Further, when the brake ECU 6 sets the reference servo pressure (step S61 in FIG. 5) based on the brake pedal 10 operating amount when the servo pressure calculated in response to the brake pedal 10 operating amount exceeds (points (6) and (7) in FIG. 3) the servo pressure change threshold value (one-dot chain line and two-dot chain line in FIG. 3) which is set with the predetermined deviations BS, B0 and B1 deviated from the reference servo pressure. Accordingly, the reference servo pressure which is the reference value of the target servo pressure under the vehicle being stopped is changed only when the servo pressure calculated in response to the brake pedal 10 operating amount exceeded the servo pressure change threshold value. Therefore, the target servo pressure does not change linearly when the vehicle is stopped and accordingly, the pressure decrease and increase valves 41 and 42 which generate pilot pressure do not continuously operate to secure the durability of the pressure decrease and increase valves 41 and 42.

Further, the brake ECU 6 sets the servo pressure change threshold value (values of (13), Step S48 in FIG. 5) by setting a smaller value deviation B0 as the target servo pressure change speed (brake operating speed) is small (judgment of YES at the step S46 in FIG. 5) after the servo pressure calculated in response to the brake pedal 10 operating amount exceeded the servo pressure change threshold value (point (6) in FIG. 3). By this setting, slower the target servo pressure change speed, or smaller the brake operating speed, smaller the change amount of the reference servo pressure before and after the change thereof becomes. Therefore, the brake operating amount operated by the operator of the vehicle becomes small and the impact transmitted from the input piston 13 to the brake pedal 10 due to the displacement of the first master piston 14 in response to the change of the reference servo pressure at the time when the operator of the vehicle is sensitive to the impact transmitted to the brake pedal 10, which would not give any uncomfortable feeling to the operator of the vehicle. On the other hand, larger servo pressure change threshold value is set (values (12) in FIG. 3, step S47 in FIG. 5) when the operator of the vehicle is not so sensitive to the impact transmitted from the brake pedal 10 upon a large change of operating amount of the brake pedal 10 by the operator of the vehicle. In other words, since the deviation B1 is changed to the deviation BS which is larger than the deviation B1, the change frequency of the reference servo pressure becomes less and accordingly, the operation frequencies of the pressure decrease and increase valves 41 and 42 become less, thereby to secure the durability thereof.

Further, the brake ECU 6 sets the servo pressure change threshold value (values (15) in FIG. 3, step S53 in FIG. 5) by setting a larger deviation BS when the time from the setting of the servo pressure change threshold value set based on the deviation B0 to the time that the set servo pressure change threshold value has not been changed exceeded the predetermined time TR (point (14) in FIG. 3, step S52; YES), when the small deviation B0 which is smaller than the deviation BS (reference deviation). Thus, since the deviation B0 is changed to a larger deviation BS which is larger than the deviation B0, the change frequency of the reference servo pressure becomes less and accordingly, the operation frequencies of the pressure decrease and increase valves 41 and 42 become less, thereby to secure the durability thereof.

As explained and shown in FIG. 3, the target cylinder pressure is changed stepwise based on the reference servo pressure. It is however, changed that the reference servo pressure calculated when the vehicle is stopped may be set to be the target servo pressure during the vehicle is stopped.

According to the embodiment explained above, the brake ECU 6 calculates the target friction braking force based on the brake pedal depression amount and based on the set target friction braking force, the brake ECU 6 calculates the target servo pressure directly. However, the brake ECU 6 may calculate the target friction braking force based on the brake pedal depression amount and then based on the set target friction braking force, the brake ECU 6 may calculate the target wheel cylinder pressure and then calculate the target servo pressure based on the target wheel cylinder pressure.

According to the embodiment explained above, the brake ECU 6 calculates the target servo pressure change speed by time-differentiating the target servo pressure at the steps S41 and S42. However, the brake ECU 6 may calculate the target servo pressure change speed based on the brake operating speed which is the speed change of the brake pedal operating amount from the operating amount of the brake pedal 10 detected by the stroke sensor 72. Or further, the brake ECU 6 may calculate the brake operating speed which is a speed change of the brake pedal 10 detected by the stroke sensor 72 and compare the brake operating speed with the reference at the steps S45 and S46.

According to the embodiment as explained above, the reference servo pressure is set to be the target servo pressure. However, when the vehicle is stopped, the target servo pressure is set based on the reference servo pressure and the target servo pressure is set by adding or deducting a predetermined pressure to or from the reference servo pressure.

According to the regulator 44 of the embodiment above, the regulator 44 is provided at least with a first chamber 4A which is defined in the cylinder 441 and in communication with an accumulator (pressure accumulating portion), a second chamber 4B defined in the cylinder 441 and in communication with a servo chamber 1A, a pressure control chamber 4D defined in the cylinder 441 and in communication with the pressure increase valve 42 and the pressure decrease valve 41 and a fourth chamber 4E (pressure receiving chamber) defined in the cylinder 441 and in communication with the first master chamber 1D. Further, the accumulator 44 is at least provided with a piston 445 which advances in response to an increase of pressure in the pressure control chamber 4D or to an increase of pressure in the fourth chamber 4E and a valve portion 442, 443 and 444 which establishes fluid communication between the first chamber 4A and the second chamber 4B in response to the advancement of the piston 445. Instead of providing a stroke sensor 72, an operating force sensor may be provided to control the brake pedal depression force instead of controlling the stroke amount thereof or both may be provided.

According to the embodiment explained above, the stroke sensor 72 which corresponds to the brake operating amount detecting portion is a sensor which detects the stroke amount of the brake pedal 10. However, such brake operating amount detecting portion may be a sensor which detects the stroke of the input piston 13 or may be a sensor which detects the brake operating force (depression force) of the brake pedal 10. The pressure (reaction force pressure) in the reaction force chamber 1C is a hydraulic brake pressure corresponding to the stroke position of the master piston 14 and accordingly, the brake operating amount detecting portion may be a pressure sensor 73.

According to the embodiment of the invention, the brake operating member which transmits the operating force of the operator of the vehicle to the input piston 13 is a brake pedal 10. However, such brake operating member may be a brake lever or a brake handle. The vehicle brake device (friction brake device B) according to the embodiment of the invention may be used to an two wheeled vehicle or other vehicles without departing from the scope of the invention.

The invention claimed is:

1. A vehicle brake device for applying a friction braking force generated by a friction brake device provided at the vehicle wheel by supplying a brake fluid to a wheel cylinder of the friction brake device, the vehicle brake device comprising
   a brake operating member;
   a brake operating amount detecting means for detecting an operating amount of the brake operating member;
   a target servo pressure setting means for setting a target servo pressure based on the operating amount of the brake operating member detected by the brake operating amount detecting means;
   a servo pressure generating portion for generating a servo pressure;
   a linear valve for controlling the servo pressure generating portion so that the servo pressure generated by the servo pressure generating portion becomes the target servo pressure; and
   a vehicle stopping state judging means for judging whether a vehicle is stopped or not, wherein
   the target servo pressure setting means sets the target servo pressure based on the operating amount of the brake operating member when the vehicle stopping state judging means judges that the vehicle is not stopped, and the target servo pressure setting means sets the target servo pressure during one braking operation when the vehicle stopping state judging means judges that the vehicle is stopped, a reference servo pressure being set as the target servo pressure, when a calculated servo pressure calculated in response to the operating amount of the brake operating member is within a servo pressure change threshold value defined with a predetermined deviation from the reference servo pressure or the target servo pressure being set by adding or subtracting a predetermined pressure to or from the reference servo pressure, the reference servo pressure being set based on the operating amount of the brake operating member at the time of vehicle being stopped, the reference servo pressure being set to be constant when the calculated servo pressure is within the servo pressure change threshold value, the reference servo pressure being reset based on the operating amount of the brake operating member at the time when the calculated servo pressure exceeds the servo pressure change threshold value.

2. The vehicle brake device according to claim 1, further comprising a brake fluid pressurizing portion for supplying pressurized brake fluid to the wheel cylinder by the servo pressure generated by the servo pressure generating portion; wherein the brake fluid pressurizing portion includes:
   a master cylinder operatively connected to the wheel cylinder;
   a master piston slidably disposed in the master cylinder for changing a volume of a master chamber to be filled with the brake fluid which is supplied to the wheel cylinder by being driven by the servo pressure exerting in a servo pressure chamber defined by the master cylinder; and,
   an input piston slidably disposed in the master cylinder at a position rearward of the master piston for defining a separation chamber between the master piston and the input piston and filled with the brake fluid, the input piston being operated in association with the brake operation of the brake operating member, wherein the target servo pressure setting means calculates a brake operating speed which corresponds to an operating speed of the operating amount of the brake operating member detected by the brake operating amount detecting means and sets the servo pressure change threshold value by setting the deviation which value is set to be decreased when the value of the brake operating speed is decreased, after the calculated servo pressure has exceeded the servo pressure change threshold value.

3. The vehicle brake device according to claim 2, wherein the target servo pressure setting means sets the servo pressure change threshold value by setting the deviation which value is set to be increased when the time from the setting of the servo pressure change threshold value set based on the deviation to the time that the set servo pressure change threshold value has not been changed, exceeds a predetermined time, when the deviation which is smaller than a reference deviation is set.

4. A vehicle brake device for applying a friction braking force generated by a friction brake device provided at the vehicle wheel by supplying a brake fluid to a wheel cylinder of the friction brake device, the vehicle brake device comprising
   a brake operating member;
   a brake operating amount detecting means for detecting an operating amount of the brake operating member;
   a target servo pressure setting means for setting a target servo pressure based on the operating amount of the brake operating member detected by the brake operating amount detecting means;
   a servo pressure generating portion for generating a servo pressure;
   a brake fluid pressurizing portion for supplying pressurized brake fluid to the wheel cylinder by the servo pressure generated by the servo pressure generating portion;
   a linear valve for controlling the servo pressure generating portion so that the servo pressure generated by the servo pressure generating portion becomes the target servo pressure; and
   a vehicle stopping state judging means for judging whether a vehicle is stopped or not, wherein
   the target servo pressure setting means sets the target servo pressure based on the operating amount of the brake operating member when the vehicle stopping state judging means judges that the vehicle is not stopped, and
   the target servo pressure setting means sets the target servo pressure during one braking operation when the vehicle stopping state judging means judges that the vehicle is stopped, a reference servo pressure being set as the target servo pressure, when a calculated servo pressure calculated in response to the operating amount of the brake operating member is within a servo pressure change threshold value defined with a predetermined deviation from the reference servo pressure or the target servo pressure being set by adding or subtracting a predetermined pressure to or from the reference servo pressure, the reference servo pressure being set based on the operating amount of the brake operating member at the time of vehicle being stopped, the reference servo pressure being set to be constant when the calculated servo pressure is within the servo pressure change threshold value, the reference servo pressure being reset based on the operating amount of the brake operating member at the time when the calculated servo pressure exceeds the servo pressure change threshold value.

5. The vehicle brake device according to claim 4, wherein the target servo pressure setting means sets the servo pressure change threshold value by setting the deviation which value is set to be increased when the time from the setting of the servo pressure change threshold value set based on the deviation to the time that the set servo pressure change threshold value has not been changed, exceeds a predetermined time, when the deviation which is smaller than a reference deviation is set.

* * * * *